US012563094B2

(12) United States Patent
Singh

(10) Patent No.: US 12,563,094 B2
(45) Date of Patent: Feb. 24, 2026

(54) SYSTEMS AND METHODS FOR PREVENTING ONE-TIME PASSWORD PHISHING

(71) Applicant: Citrix Systems, Inc., Ft. Lauderdale, FL (US)

(72) Inventor: Manbinder Pal Singh, Coral Springs, FL (US)

(*) Notice: Subject to any disclaimer, the term of this patent is extended or adjusted under 35 U.S.C. 154(b) by 791 days.

(21) Appl. No.: 17/730,472

(22) Filed: Apr. 27, 2022

(65) Prior Publication Data

US 2023/0353596 A1    Nov. 2, 2023

(51) Int. Cl.
H04L 9/40        (2022.01)
G06F 21/12       (2013.01)

(52) U.S. Cl.
CPC ........ H04L 63/1483 (2013.01); G06F 21/128 (2013.01)

(58) Field of Classification Search
CPC ............................ H04L 63/1483; G06F 21/128
See application file for complete search history.

(56) References Cited

U.S. PATENT DOCUMENTS

| | | | |
|---|---|---|---|
| 8,220,047 B1 | 7/2012 | Soghoian | |
| 8,776,196 B1 | 7/2014 | Oliver | |
| 8,838,973 B1 | 9/2014 | Yung | |
| 9,002,750 B1 | 4/2015 | Chu | |
| 9,419,968 B1 * | 8/2016 | Pei .......................... | G06F 21/31 |
| 9,674,213 B2 | 6/2017 | Oberheide | |
| 9,736,147 B1 | 8/2017 | Mead | |

| | | | |
|---|---|---|---|
| 10,972,477 B1 * | 4/2021 | McCorkendale ... | H04L 63/1433 |
| 2007/0006305 A1 | 1/2007 | Florencio | |
| 2007/0067828 A1 | 3/2007 | Bychkov | |
| 2007/0199054 A1 | 8/2007 | Florencio | |
| 2009/0063850 A1 * | 3/2009 | Joram ................... | H04L 9/3271 |
| | | | 713/155 |

(Continued)

FOREIGN PATENT DOCUMENTS

| | | |
|---|---|---|
| EP | 2348442 B1 | 7/2016 |
| WO | 202156230 A1 | 4/2021 |

OTHER PUBLICATIONS

Leung, Chun-Ming; "Depress phishing by CAPTCHA with OTP," 3rd International Conference on Anti-counterfeiting, Security, and Identification in Communication, IEEE, Hong Kong, China, Aug. 20-22, 2009, pp. 187-192.*

(Continued)

*Primary Examiner* — Victor Lesniewski

(57)        ABSTRACT

Systems and methods for preventing phishing attacks are provided. For example, the computer system includes at least one processor that is configured to recognize a uniform resource locator (URL) to which a web browser is navigating as a URL associated with a website for which phishing protection is to be provided, the recognition based on an absence of the URL from a history of visited URLs for which a user has previously visited, monitor user input into one or more data fields associated with the website, determine whether the user input into the one or more data fields includes automatically generated one-time password (OTP) information by comparing the user input against one or more OTP information characteristics, and perform a security action in response to determining user entry of OTP information.

21 Claims, 7 Drawing Sheets

170

(56) References Cited

U.S. PATENT DOCUMENTS

| | | | |
|---|---|---|---|
| 2009/0172775 A1* | 7/2009 | Mardikar | H04L 9/3228 726/2 |
| 2010/0313266 A1* | 12/2010 | Feng | H04L 67/10 707/E17.014 |
| 2016/0253492 A1 | 9/2016 | Chougle | |
| 2017/0041309 A1* | 2/2017 | Ekambaram | H04L 63/1483 |
| 2017/0118243 A1* | 4/2017 | Yeh | H04L 63/1483 |
| 2017/0237775 A1* | 8/2017 | Lu | H04L 67/02 726/4 |
| 2019/0327268 A1* | 10/2019 | Goutal | H04L 63/101 |
| 2021/0092155 A1 | 3/2021 | Wang | |
| 2021/0377301 A1* | 12/2021 | Desai | G06F 21/577 |
| 2022/0400134 A1* | 12/2022 | Chen Kaidi | G06V 30/19 |
| 2023/0029152 A1* | 1/2023 | Zaloum | G06F 21/316 |
| 2023/0262079 A1* | 8/2023 | Feldbau | H04L 63/101 726/4 |

OTHER PUBLICATIONS

Adebowale M.A. et al., "Intelligent Phishing Detection Scheme Using Deep Learning Algorithms", retrieved from the Internet: https://arro.anglia.ac.uk/id/eprint/705509/1/Adebowale_2020.pdf, 22 pages.

* cited by examiner

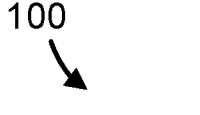
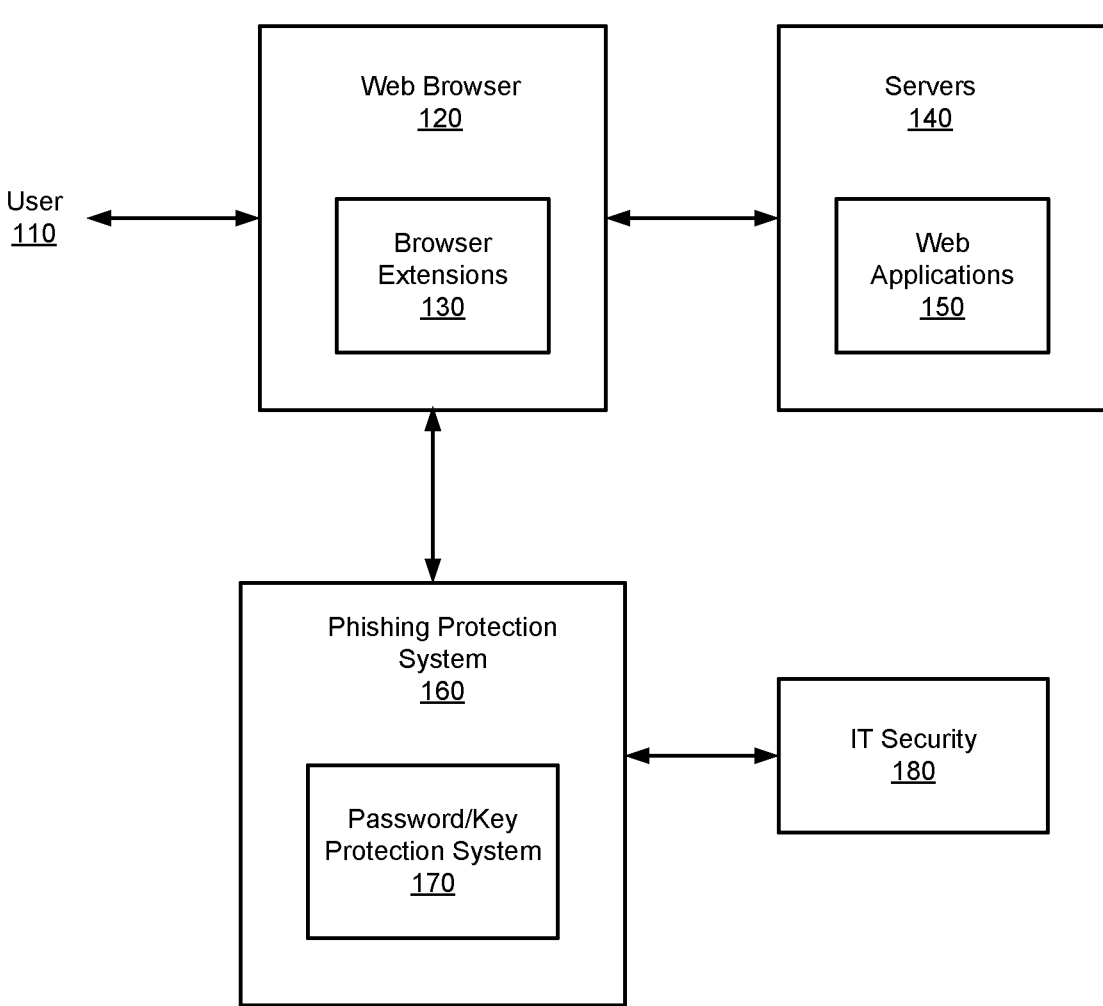
FIG. 1

200

170

```
┌──────────────┐      ┌──────────────┐      ┌──────────────┐
│  IT list of  │      │              │      │   Website    │
│   websites   │─────▶│ URL Monitor  │◀────▶│  Reputation  │
│     310      │      │     300      │      │   Checker    │
│              │      │              │      │     320      │
└──────────────┘      └──────┬───────┘      └──────────────┘
                             │
                             ▼
                      ┌──────────────┐
                      │    Login     │
                      │   Monitor    │
                      │     330      │
                      └──────┬───────┘
                             │
                             ▼
                      ┌──────────────┐                    ┌──────────────┐
                      │    Input     │                    │ False Alarm  │
                      │  Extractor   │◀────────────┬─────▶│  Mitigation  │
                      │     340      │             │      │   System     │
                      │              │             │      │     370      │
                      └──────┬───────┘             │      └──────────────┘
                             │                     │
                             ▼                     │      ┌──────────────┐
                      ┌──────────────┐             │      │Keystroke Rate│
                      │    Input     │             ├─────▶│   Detector   │
                      │   Analyzer   │             │      │     380      │
                      │     350      │             │      └──────────────┘
                      └──────┬───────┘             │
                             │                     │      ┌──────────────┐
                             ▼                     │      │Copy-and-Paste│
                      ┌──────────────┐             └─────▶│   Detector   │
                      │ Processing/  │                    │     390      │
                      │Alert System  │                    └──────────────┘
                      │     360      │
                      └──────────────┘
```

Computing Platform 600

SYSTEMS AND METHODS FOR PREVENTING ONE-TIME PASSWORD PHISHING

BACKGROUND

Cyber security is an issue of great importance, as attacks on computer systems and the users of those systems continue to increase. One of the most prevalent, and often most successful, forms of attack is known as the "phishing attack," in which the user is tricked into willingly providing credentials, such as login credentials such as passwords, to a bad actor or hacker. This can occur under various scenarios. For example, the user may be directed to the hacker's website which is disguised as a legitimate website, and which asks the user to login using his credentials. Many other examples are possible.

SUMMARY

In at least one example, a computer system is provided. The computer system includes a memory and at least one processor operably coupled to the memory. The at least one processor is configured to recognize a uniform resource locator (URL) to which a web browser is navigating as a URL associated with a website for which phishing protection is to be provided, the recognition based on an absence of the URL from a history of visited URLs for which a user has previously visited, monitor user input into one or more data fields associated with the website, determine whether the user input into the one or more data fields includes automatically generated one-time password (OTP) information by comparing the user input against one or more OTP information characteristics, and perform a security action in response to determining user entry of OTP information.

Implementations of the computer system can include one or more of the following features.

In examples of the computer system, the memory can store the OTP information, the OTP information including a plurality of initial character strings, and the at least one processor can be configured to determine whether the user input includes automatically generated OTP information by being further configured to determine a first set of characters of the user input, compare the first set of characters against the plurality of initial character strings stored on the memory, determine whether the first set of characters matches at least one of the plurality of OTP information initial character strings, and if the first set of characters matches at least one of the plurality of OTP information initial character strings, determine that the user input includes automatically generated OTP information.

In examples of the computer system, the at least one processor being configured to determine whether the user input includes automatically generated OTP information can include the at least one processor being further configured to monitor a rate at which a sequence of characters associated with the user input is entered and, in response to the monitored rate exceeding a threshold keystroke rate, determine that the user input includes automatically generated OTP information.

In examples of the computer system, the at least one processor being configured to determine whether the user input includes automatically generated OTP information can include the at least one processor being further configured to determine a number of characters included in the user input and, if the number of characters included in the user input exceeds a character threshold, determine that the user input includes automatically generated OTP information.

In examples of the computer system, the at least one processor being configured to determine whether the user input includes automatically generated OTP information can include the at least one processor being further configured to detect an operation to paste a character string into the one or more data fields as the user input, determine a number of characters included in the user input, and, if the number of characters included in the user input exceeds a character threshold, determine that the user input includes automatically generated OTP information.

In examples of the computer system, the at least one processor can be further configured to receive a request to register a user input device, the user input device configured to generate the automatically generated OTP information, receive sample information from the user input device, and determine at least a portion of the one or more OTP information characteristics based upon the sample information.

In examples of the computer system, the at least one processor being configured to perform a security action in response to determining user entry of OTP information can include the at least one processor being further configured to store the OTP information in the memory, provide an alert to the user indicating entry of the OTP information, and process the OTP information based upon a user response received in reply to the alert.

In another example, a method of providing protection from phishing attacks is provided. The method includes recognizing, by a processor, a URL to which a web browser is navigating as a URL associated with a website for which phishing protection is to be provided, the recognition based on an absence of the URL from a history of visited URLs for which a user has previously visited; monitoring, by the processor, user input into one or more data fields associated with the website; determining, by the processor, whether the user input into the one or more data fields includes automatically generated OTP information by comparing the user input against one or more OTP information characteristics; and performing, by the processor, a security action in response to determining user entry of OTP information.

Implementations of the method of providing protection from phishing attacks can include one or more of the following features.

In examples of the method, determining whether the user input includes automatically generated OTP information can include storing, by the processor at a memory operably coupled to the processor, the OTP information, the OTP information including a plurality of initial character strings; determining, by the processor, a first set of characters of the user input; comparing, by the processor, the first set of characters against the plurality of initial character strings stored on the memory; determining, by the processor, whether the first set of characters matches at least one of the plurality of OTP information initial character strings; and if the first set of characters matches at least one of the plurality of OTP information initial character strings, determining, by the processor, that the user input includes automatically generated OTP information.

In examples of the method, determining whether the user input includes automatically generated OTP information can include monitoring, by the processor, a rate at which a sequence of characters associated with the user input is entered and, in response to the monitored rate exceeding a threshold keystroke rate, determining, by the processor, that the user input includes automatically generated OTP information.

In examples of the method, determining whether the user input includes automatically generated OTP information can include determining, by the processor, a number of characters included in the user input and, if the number of characters included in the user input exceeds a character threshold, determining, by the processor, that the user input includes automatically generated OTP information.

In examples of the method, determining whether the user input includes automatically generated OTP information can include detecting, by the processor, an operation to paste a character string into the one or more data fields as the user input; determining, by the processor, a number of characters included in the user input; and if the number of characters included in the user input exceeds a character threshold, determining, by the processor, that the user input includes automatically generated OTP information.

In examples of the method, the method can further include receiving, by the processor, a request to register a user input device, the user input device configured to generate the automatically generated OTP information; receiving, by the processor, sample information from the user input device; and determining, by the processor, at least a portion of the one or more OTP information characteristics based upon the sample information.

In examples of the method, performing a security action in response to determining user entry of OTP information can include storing, by the processor, the OTP information in a memory operably coupled to the processor; providing, by the processor, an alert to the user indicating entry of the OTP information; and processing, by the processor, the OTP information based upon a user response received in reply to the alert.

In another example, a non-transitory computer-readable medium can be configured to store computer-executable instructions to implement a process providing protection from phishing attacks. The instructions include instructions to recognize a URL to which a web browser is navigating as a URL associated with a website for which phishing protection is to be provided, the recognition based on an absence of the URL from a history of visited URLs for which a user has previously visited, monitor user input into one or more data fields associated with the website, determine whether the user input into the one or more data fields includes automatically generated OTP information by comparing the user input against one or more OTP information characteristics, and perform a security action in response to determining user entry of OTP information.

Implementations of the non-transitory computer-readable medium can include one or more of the following features.

In examples of the non-transitory computer-readable medium, the instructions to determine whether the user input includes automatically generated OTP information can include instructions to store the OTP information, the OTP information including a plurality of initial character strings, determine a first set of characters of the user input, compare the first set of characters against the plurality of initial character strings stored on the memory, determine whether the first set of characters matches at least one of the plurality of OTP information initial character strings, and, if the first set of characters matches at least one of the plurality of OTP information initial character strings, determine that the user input includes automatically generated OTP information.

In examples of the non-transitory computer-readable medium, the instructions to determine whether the user input includes automatically generated OTP information can include instructions to monitor a rate at which a sequence of characters associated with the user input is entered and, in response to the monitored rate exceeding a threshold keystroke rate, determine that the user input includes automatically generated OTP information.

In examples of the non-transitory computer-readable medium, the instructions to determine whether the user input includes automatically generated OTP information can include instructions to determine a number of characters included in the user input and, if the number of characters included in the user input exceeds a character threshold, determine that the user input includes automatically generated OTP information.

In examples of the non-transitory computer-readable medium, the instructions to determine whether the user input includes automatically generated OTP information can include instructions to detect an operation to paste a character string into the one or more data fields as the user input, determine a number of characters included in the user input, and, if the number of characters included in the user input exceeds a character threshold, determine that the user input includes automatically generated OTP information.

In examples of the non-transitory computer-readable medium, the non-transitory computer-readable medium can further include instructions to receive a request to register a user input device, the user input device configured to generate the automatically generated OTP information, receive sample information from the user input device, and determine at least a portion of the one or more OTP information characteristics based upon the sample information.

In examples of the non-transitory computer-readable medium, the instructions to perform a security action in response to determining user entry of OTP information can include instructions to store the OTP information in a memory, provide an alert to the user indicating entry of the OTP information, and process the OTP information based upon a user response received in reply to the alert.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

FIG. 1 is a top-level block diagram of an implementation of a system for providing protection against theft of user credentials by phishing websites, in accordance with an example of the present disclosure.

FIG. 3 is a block diagram of a password protection system, in accordance with an example of the present disclosure.

DETAILED DESCRIPTION

Figure 2:
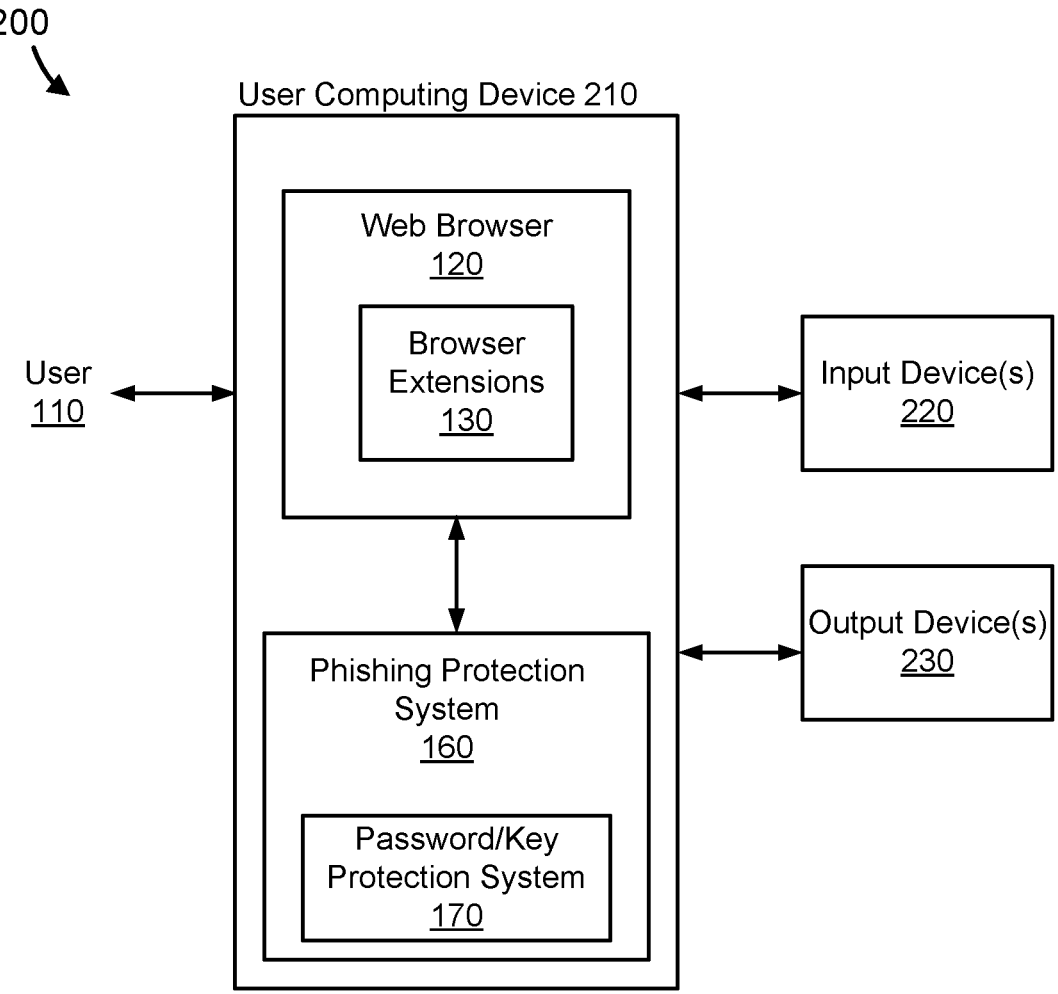
FIG. 2 is a block diagram of a user computing device, in accordance with an example of the present disclosure.

As noted previously, cyber security is a growing concern as attacks on computer systems and the users of those systems increase. Phishing attacks, in particular, pose a serious problem. In a phishing attack, the user may visit a website that is believed to be legitimate and is fooled into entering his credentials (e.g., a password) on an input form of the website. It can often be difficult or impossible for the user to recognize a nefarious website, and so urging users to be diligent is generally not an effective solution to this problem. Likewise, maintaining a blacklist of websites that are known to be dangerous is not effective, as such a list would require constant updates and can never be complete.

One attempt to limit the impact of phishing attacks is the implementation of a one-time password (OTP). When using an OTP, a single-use password is dynamically created for and used by a user accessing a website. As the OTP is only valid for a short time and a single use, the opportunity for a nefarious website to collect valuable information for a particular user is reduced. However, sophisticated nefarious websites are being configured to automatically use information input by a user such as an OTP to access the user's information before the OTP expires.

To address these and other problems, and as summarized above, various examples described herein are directed to systems and methods for protection against theft of user credentials by phishing websites. In some examples, the disclosed techniques are implemented, at least in part, by a web browser plug-in or extension configured to monitor for entry of an OTP by a user accessing, for example, a website associated with a domain that the user has not previously accessed. In certain implementations, monitoring for entry of an OTP can include monitoring for one or more character entry processes such as monitoring for keystrokes, cutting/pasting, dragging and dropping information, and other similar character entry methods.

In some examples, the disclosed techniques provide password protection by preventing a user from entering an OTP into a website by monitoring user character input into one or more website fields and, upon detecting character input, verifying that the entered characters are not an OTP (or part of an OTP). This is accomplished by monitoring exactly how the characters are entered into the field as well as various characteristics of the entered characters. For example, if a string of characters are entered at a keystroke rate that is not possible by a human typing (e.g., hundreds or thousands of characters per second), the input monitoring may determine that the input characters were automatically entered by, for example, a keyboard or other similar input device that is configured to automatically generate and enter an OTP. Similarly, if the input monitoring determines that a long string of characters were cut and pasted into the data field, the monitor may further analyze the characters to determine if they represent an OTP. If the input monitoring determines that an OTP has been entered, the user can be alerted, or other appropriate action can be taken to prevent a malicious website from obtaining the OTP. For example, when the input monitoring determines that OTP information has been received, the input monitor can temporarily cache or otherwise store the received information before the information is entered into a text field within the requesting application (e.g., within a webpage browser). The input manager can then send an alert to the user, the alert prompting the user to confirm whether or not they wish to proceed with entry of the OTP information. If the user approves the entry, the input monitoring can load the information from the memory and insert the information into the appropriate text field. If the user does not approve the entry, the input monitoring can take one or more other actions including, for example, notifying information technology (IT) administration, logging the event for later analysis, and/or forcing the user to review and/or change other access credentials such as username/password information.

In some examples, the disclosed techniques can employ a device setup and registration phase where information is collected about the OTP input device and any domain-related accounts associated with the input device for use during the phishing protection phase. For example, during the setup and registration, information related to the OTP input device such as device ID, output format (e.g., character string length and time to input), device-specific output information for a particular domain (e.g., a string of n characters that are always output by the OTP input device for a particular domain), domain-specific information (e.g., root domain information, URL information, protocol security information), and other similar information can be collected. The input monitoring process as described herein can utilize this information to determine if a string of entered characters are an OTP.

In some implementations, during the monitoring, a list of selected websites may be provided by IT administration, or other suitable sources, and may include work-related websites, trusted websites, or websites that are otherwise of interest. Input monitoring for these websites may be reduced or eliminated altogether. When a user accesses a website that is not included in the list, the input monitoring process as described herein may be implemented to provide added protection against websites phishing for user information.

These systems and methods overcome a number of security problems. For example, a user may navigate to a website that is unknown to the user, and the website may ask the user to enter an OTP. This request may provide a plausible reason for this request and appear to be legitimate. Upon detection of the entry of an OTP, the processes as described herein can prompt the user to reconfirm that they are attempting to access a particular website associate with a particular domain prior to submission of the OTP information to the website.

As yet another example, a user may attempt to navigate to a legitimate website but get redirected to a phishing website that closely resembles the legitimate website. Here again, the phishing website may ask the user to enter an OTP in a compellingly plausible matter, and the disclosed techniques will prevent or discourage the user from doing so by prompting confirmation of the entry by the user.

Thus, and in accordance with at least some examples disclosed herein, systems and methods for securing user passwords from detection by a phishing attack are provided. These systems and methods provide for detection and blocking of attempts by a user to enter their password to a phishing website.

As will be understood in view of this disclosure, the systems and methods for providing protection against theft of user credentials by phishing websites provided herein have several advantages over existing methods which rely on user vigilance, which is subject to lapse, or blacklisted websites, which require constant updates and can never be complete. For instance, the systems and methods described herein provide automated protection and do not rely on user action.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements, and features discussed in connection with any one or more examples are not intended to be excluded from a similar role in any other examples.

Password Protection System

FIG. 1 is a top-level block diagram of an implementation of a system 100 for providing protection against theft of user credentials by phishing websites, in accordance with an example of the present disclosure. As shown in FIG. 1, the system comprises a web browser 120, including browser extensions 130, and a phishing protection system 160, including a password protection system 170.

The web browser 120 is configured to enable the user 110 to navigate to servers 140 and the websites and web applications 150 hosted on those servers. The operation of phishing protection system 160 will be explained in greater detail below, but at a high-level, the password protection system 170 is configured to monitor user activity to determine when, for example, the user is entering a OTP for access to a secure website or other similar secure resource. As described below, the password protection system 170 can be configured to detect that the user is entering an OTP, and in response to the detection, take appropriate security measures. These measures may include caching or otherwise storing OTP information such that the information is withheld from a data entry field, alerting the user, obtaining confirmation of trust from the user, and alerting IT security/administration 180.

FIG. 2 is a block diagram of a sample system 200 including a computing device 210 that can be used by a user such as user 110 to access one or more remote resources such as servers 140. As shown in FIG. 2, the computing device 200 can include one or more additional peripherals such as input device(s) 220 and output device(s) 230. As described herein, the input device(s) 220 can include a keyboard or other similar device that is operably connected to the computing device 210 using a particular communication standard such as universal serial bus (USB). However, it should be noted that a USB connection is shown by way of example only. Additional communication protocols and techniques such as Wi-Fi, Bluetooth, serial data communications, parallel data communications, and other similar communication types can be used to connect an input device and a computing device as described herein.

In certain implementations, the USB keyboard can include an input device that is configured to automatically generate an OTP in response to a user input. For example, the USB keyboard can be configured to automatically generate an OTP in response to a user input based upon a previously registered seed as input into a password generation algorithm. The OTP as generated by the USB keyboard can be valid for a particular period of time before expiring. For example, the generated OTP can be valid for thirty seconds, one minute, two minutes, five minutes, and other similar periods of time.

As also shown in FIG. 2, the computing device 210 can include the web browser 120 in communication with the one or more browser extensions 130 as described above in regard to FIG. 1. Similarly, as further shown in FIG. 2, the web browser 120 can be operatively connected to the phishing protection system 160 including the password/key protection system 170 as described above in regard to FIG. 1.

FIG. 3 is a block diagram of the password/key protection system 170, in accordance with an example of the present disclosure. The password/key protection system 170 can access a list 310 of websites provided by, for example, IT security 180 as shown in FIG. 1 and described above. In some examples, the list 310 can include work-related websites or websites that are otherwise of interest to a user on a regular basis. In some examples, the list 310 can include websites that are known or believed to be trusted, for example, based on data provided by a website reputation checker 320. The use of the list 310 enables the password/key protection system 170 to treat these websites as "always-allow" sites for which protection is not required. This can improve efficiency and reduce the false alarm rate.

As further shown in FIG. 3, the password/key protection system 170 can include a uniform resource locator (URL) monitor 300, a login monitor 330, an input extractor 340, an input analyzer 350, a processing/alert system 360, a false alarm mitigation system 370, a keystroke rate detector 380, and a copy-and-paste detector 390.

The URL monitor 300 can be configured to monitor user navigations to websites and compare the domain names of those websites to entries in the IT-provided list 310 of websites. If there is a match (e.g., if a domain name of a website is the same as a domain name in the list 310), and that website has already been verified or otherwise marked as trusted, then no further action with respect to phishing protection is required, and the user is allowed to proceed and interact with that website. If, however, there is no match, and that website has not been previously verified or otherwise marked as trusted, then the password/key detection process may now be performed on that website. Additionally, in some examples, if there is no match, the website reputation checker 320 may be consulted to determine if the website is trustworthy, and if so, the user is allowed to proceed and interact with that website without requiring further password protection. In some examples, this behavior may be configured by the IT administrator.

The website reputation checker 320 may also be employed to generate a blacklist of suspected phishing sites which can be used to trigger a security alert or other corrective action. The website reputation checker 320 may employ any suitable techniques to monitor the reputation of websites, in light of the present disclosure. In some examples, the website reputation checker 320 may employ the Webroot Brightcloud™ application programming interface (API).

Otherwise, if there is not a match, the login monitor 330 can be configured to monitor user logins to websites that are not included on the list 310 of websites. The input extractor 340 can be configured to detect that the user is either manually or automatically entering characters (e.g., typing keystrokes) into an input field or form of the website, or any other feature of the website (e.g., an image file presented to the user), and to extract those characters into a copy of the input string.

In some examples, the input extractor 340 can detect that the characters being entered are password related based on a determination that the input field or form is tagged with a hypertext markup language (HTML) label of "type=password," as would typically be the case with a legitimate website. In some examples, other types of HTML labels can be used to identify an input data field. The input extractor can be configured to determine that an input field including one or more specific keywords can be used to identify a data entry field. In some examples, the keywords can include "one time code", OTP, token, "one time token", and other similar keywords.

The input analyzer 350 can be configured to process any input as determined and extracted by the input extractor 340. For example, the input analyzer 350 can process the extracted input character string to determine if the input characters include OTP information. Based upon the output of the input analyzer 350, the processing/alert system 360 can determine what steps to take next. For example, the processing/alert system 360 can send a notification to the user to verify that the website being accessed is requesting OTP information and that the user confirms the website's domain is accurate. For example, the notification can include an alert comprising a pop-up window informing the user that they are entering OTP information into the website and asking for confirmation to proceed. In some examples, the alert may include a warning sent to the IT administrator 180 as shown in FIG. 1

As further shown in FIG. 3, the input extractor may be configured to operate with one or more of the false mitigation system 370, the keystroke rate detector 380, and the copy-and-paste detector 390.

The false alarm mitigation system 370 can be configured to reduce the false alarm rate of OTP phishing alerts. In some examples, the false alarm mitigation system 370 can limit alerts to incidents in which the website is being visited for the first time and/or an OTP is being supplied to the website for the first time. In some examples, the web browser history of visited URLs may be used to obtain this information. This eliminates multiple alerts for the same potential phishing threat. In some examples, the false alarm mitigation system 370 can limit alerts to incidents in which the OTP information is being entered into an input field or form that is not labeled as "type=password." This can be effective since legitimate websites that ask for OTP information typically use the "type=password" label as an aid to the browser password manager. Suspicion of credential theft is raised if a website asks the user to enter a password into a field that is not labeled in this manner. In some examples, the false alarm mitigation system 370 can limit alerts to incidents in which the OTP information is being entered into a first or second field of the web page since OTP information (or a username and OTP information) are typically the initial requests of a webpage (e.g., first and/or second fields requiring input).

The keystroke rate detector 380 can be configured to detect entry of characters at a rate that exceeds human typing capabilities or that is otherwise unlikely to result from human typing (e.g., rates of 5 characters per second, 10 characters per second, 16 characters per second, hundreds of characters per second, thousands of characters per second or more). Typically, OTP information is entered via an input device such as an OTP input keyboard or via a process that automatically generates OTP information. In such an example, the OTP information is entered into a data field at a rate that exceeds human typing capabilities or is otherwise unlikely to have been generated by human typing. Thus, if the keystroke rate detector 380 detects character entry at an excessive rate, the input extractor 340 can determine that OTP information may be entered into the data field. Alternatively or additionally, some implementations of the keystroke rate detector 380 can be configured to detect entry of characters at a rate that is more regular and uniform than human typing. In these implementations, the keystroke rate detector 380 can measure time intervals between reception of individual characters and calculate a statistical metric indicative of dispersion of the measure time intervals (e.g., variance, standard deviation, etc.). Further, in these implementations, the input extractor 340 can determine that OTP information was entered into a data field where the calculated metric is less than a configurable threshold value (e.g., 100 milliseconds where the calculated metric is standard deviation). Thus, if the keystroke rate detector 380 detects a character entry rate with low variability, the input extractor 340 can determine that OTP information may be entered into the data field.

It should be noted that, when monitoring entry of characters into a data field, some examples of the keystroke rate detector 380 detect and record (e.g., within name-value pairs specifying the entered character and a timestamp at which the character was entered) each distinct, individual character entry within a sequence of character entries. Additionally, the monitoring of character entry can include a specific monitoring for one or more keystrokes which are intended to trigger a specific action. For example, a quick entry of characters can be followed by an automatic input of the "Enter" key. In such an example, the user is not given the option to click, enter a keystroke, or otherwise confirm the entry of characters. By monitoring for character entry and specific automatic keystroke entry, such monitoring can also prevent a user from entering sensitive information such as an OTP into additional applications such as a messaging and/or social media application. By monitoring for character and automatic keystroke entry, and preventing unwanted entry of sensitive information such as OTP information as described herein, a user can be protected regardless of what specific application they are interacting with. However, this form of monitoring is different from copy-and-paste detection, as will now be discussed.

The copy-and-paste detector 390 can be configured to detect that the user is performing a copy-and-paste operation to insert OTP information into an input field or form of the web page. Given that OTPs are generally long in length (e.g., 44 characters), a user may cut and paste the OTP information from the output of an OTP generation algorithm. In some examples, when using an input device such as an OTP input keyboard, the generated OTP information may be automatically cut and pasted by the input device into the data field on the website. In such an example, subsequent pasting operations by the user may result in the OTP information being inappropriately entered into another field. In such an example, the copy-and-paste detector 390 can detect such a paste operation. In some examples, the copy-and-paste detector 390 can be configured to detect the keystrokes (e.g., control-c, control-v) or other operations (e.g., copy/paste events) that are associated with the copy-and-paste operation, and then intercept the string that would be pasted before it is provided to the web page. In some examples, this may be accomplished by monitoring for the web browsers, JavaScript, paste event, or drag/drop events.

Password Protection Process

Figure 6:
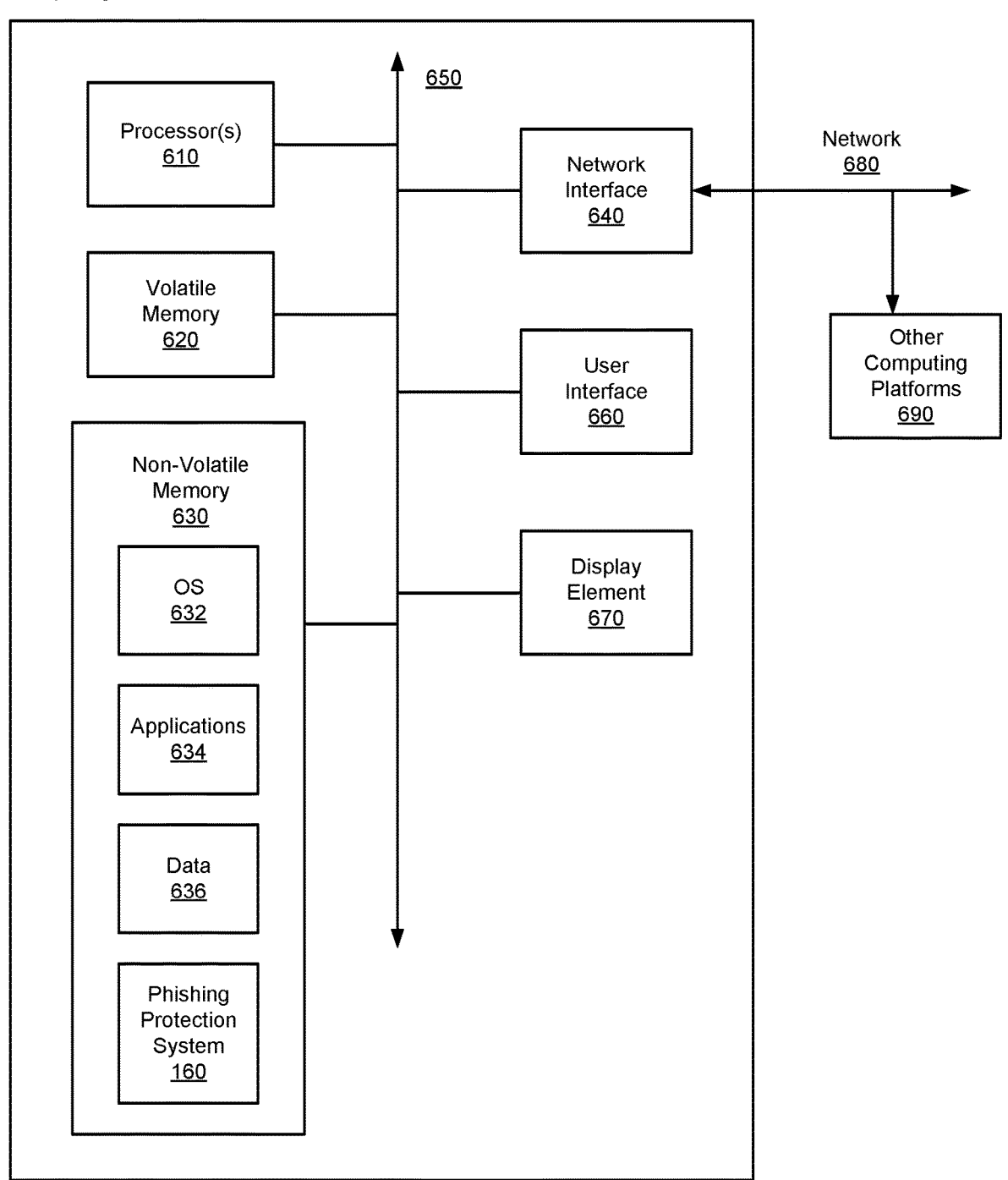
FIG. 6 is a block diagram of a computing platform configured to perform a process for providing protection against theft of user credentials by phishing websites, in accordance with an example of the present disclosure.

As described above, some examples of the system 100 of FIG. 1 are configured to perform a process for providing protection against theft of user credentials by phishing websites. The processes may be executed on a processor of any suitable type (e.g., processor 610 as shown in FIG. 6 and described hereinbelow). The processes may further be implemented through execution of a web browser plug-in or extension.

Figure 4:
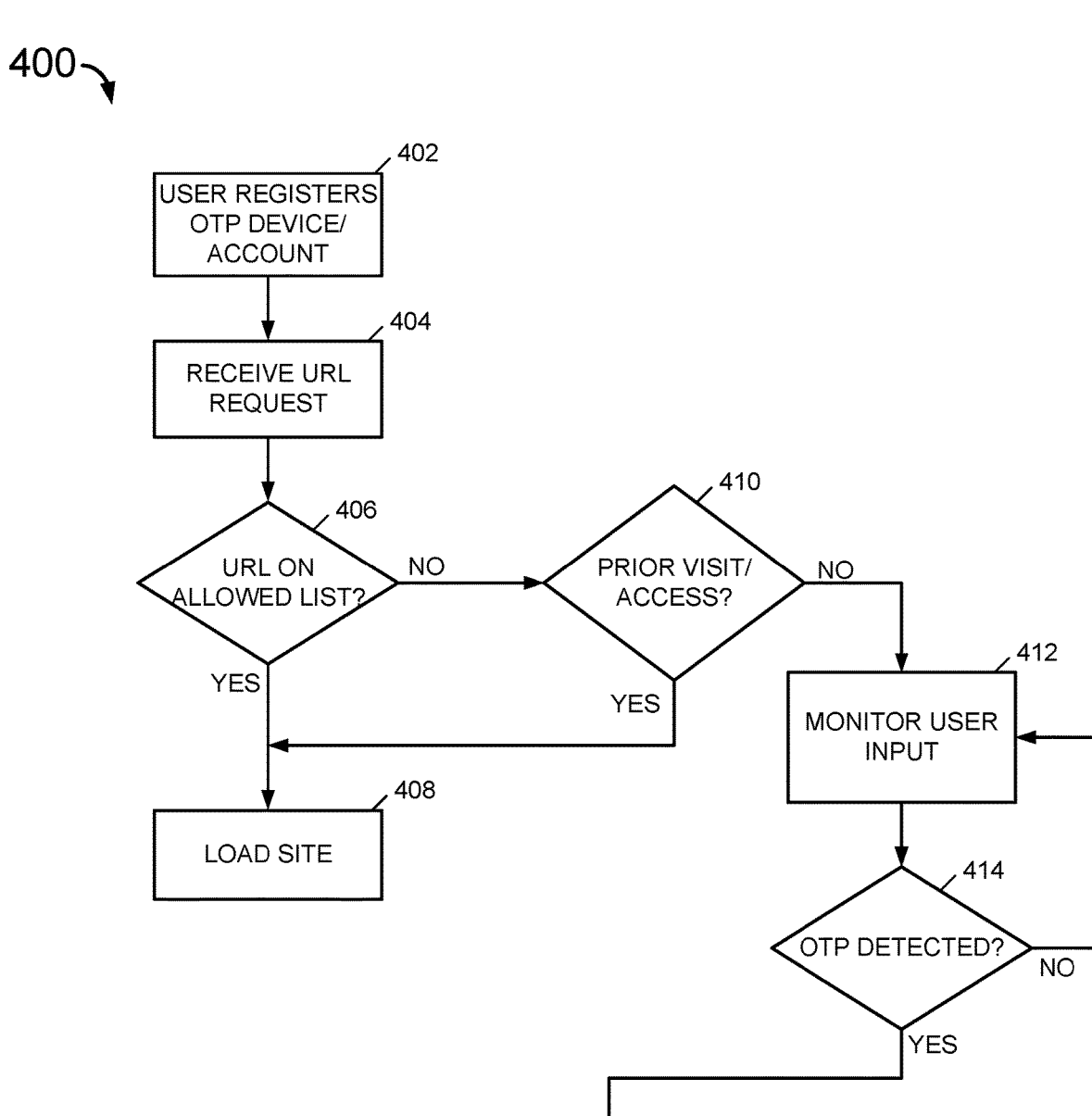
FIG. 4 is a flow diagram of a process for providing protection against theft of user credentials by phishing websites, in accordance with an example of the present disclosure.

FIG. 4 is a flow diagram of a process 400 for providing protection against theft of user credentials by phishing websites, executed by, for example, a processor or other similar computing device configured to execute one or more instructions for implementation of the phishing protection system 160 and the password/key protection system 170 as shown in FIG. 1, or the sub-components thereof, in accordance with an example of the present disclosure.

Figure 5A:
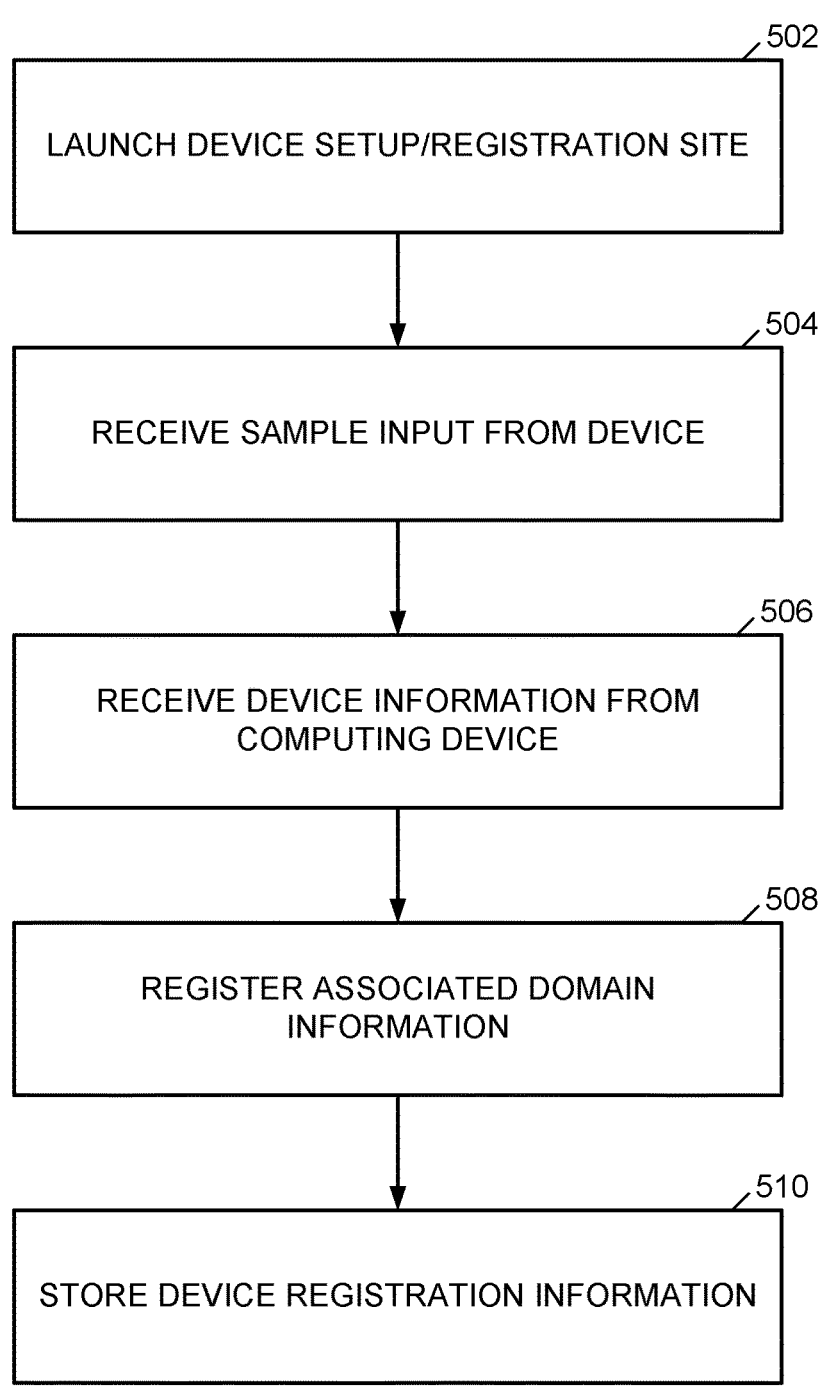
FIG. 5A is a flow diagram of an example process for registering a user input device and associated information, in accordance with an example of the present disclosure.

The process 400 can be initiated when a user registers 402 their OTP device and/or account. During the registration, the user can install the device drivers and the system can collect various information related to the device as well as characteristics related to the expected output information (e.g., number of characters, static device identifier information contained within the characters). Additional information related to the registration process is shown in FIG. 5A and described below in greater detail.

As further shown in FIG. 4, the system can receive 404 a request to open or otherwise access a particular website via a user provided URL. The system can determine 406 whether the requested website is on the "always-allowed" list, for example the IT provided list 310 of websites of FIG. 3. If the system determines that the website is on the list, the system can load 408 the site and allow the user to enter information into the website such as username and OTP information.

Conversely, if the system determines 406 that the website is not on the allowed list, the system can determine 410 if the user has previously visited the website or otherwise previously accessed the website. If the system determines 410 that the user has previously accessed the website, the system can load 408 the site and allow the user to enter information into the website such as username and OTP information.

Figure 5B:
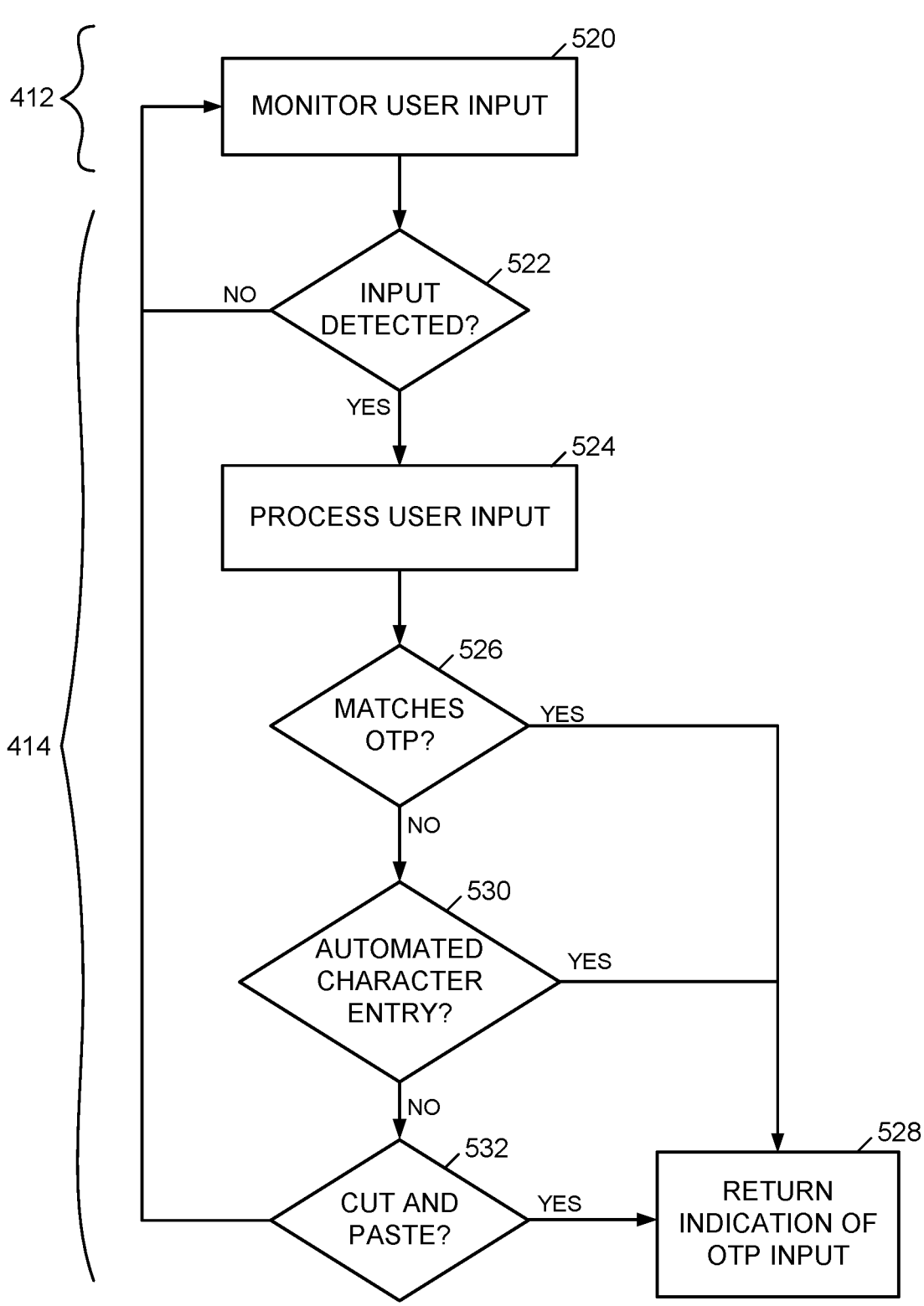
FIG. 5B is a flow diagram of an example process for determining the automatic entry of a one time password, in accordance with an example of the present disclosure.

If the system determines 410 that the user has not previously visited the website, the system will monitor 412 all user input at the website. When input is detected, the system can determine 414 if the input includes OTP information. If the system determines that the input does not include OTP information, the system can continue to monitor 412 the user input. Additional detail related to monitoring 412 user input and determining 414 whether OTP information is detected is shown in FIG. 5B and described in additional detail below.

As further shown in FIG. 4, if the system does determine 414 that the input includes OTP information, the system can block entry of the OTP information into the website and/or application and store the OTP information in memory. The system can further determine 416 whether the user has confirmed that they intended to provide the OTP information to the website. If the system determines 416 that the user did intend to provide the OTP information to the website, the system can add 418 the website to the visited-before list, load the OTP information from memory and provide the information to the website. Otherwise, if the system determines 416 that the user has not confirmed that they intended to provide the OTP information to the website, the system can generate 420 a phishing alert for delivery to the user and/or IT security as described herein. In some examples, the system can further delete the stored OTP information from memory.

FIG. 5A illustrates a more detailed example process for receiving 402 a request to register an OTP input device and an associated account as shown in FIG. 4 and described above. As shown in FIG. 5A, upon receiving the request, the system can launch 502 the device setup and registration website and/or process associated with the input device to facilitate device and account setup. For example, this can include launching an identity provider registration process and/or application or a Web/SaaS application within a distributed workspace. As described herein, such websites should be listed as safe on the IT-provided list of websites (e.g., list 310) and no further phishing prevention occurs. The browser can navigate to the launched website and begin the registration. During registration, the user can activate the input device. In response to the activation, the system can receive 504 sample input information from the device. For example, the system can receive a string of characters having a particular length (e.g., 44 characters) that was entered at a particular rate of entry (e.g., 250 characters per second). Additionally, the system can receive 506 additional information related to the input device from one or more computing systems such as the manufacturer. For example, this information can include device identification information, firmware information, and other related information associated with the input device.

In some examples, the system can also register 508 domain specific information associated with the input device. For example, the input device may generate OTP information such that a particular number of characters at the beginning of the automatically generated OTP information is the same for all websites within a particular domain. This domain mapping can be stored locally (or, in some examples, in a remote storage device such as a cloud-based storage or a remote backend storage) by the system for access during the phishing prevention as described herein.

As further shown in FIG. 5A, the system can store 510 the device registration information. For example, the system can store this information as one or more OTP characteristics associated with the OTP input device. For example, the one or more OTP characteristics can include a keystroke entry rate threshold for the input device, a character string length threshold for the input device, information related to how the character string is entered by the input device, and other similar information. In some examples, the keystroke entry rate threshold information can include keystrokes entry rates over 25 keystrokes a second, over 50 keystrokes a second, over 100 keystrokes a second, and other similar keystroke rates that would exceed what is possible for a human to manually achieve. Similarly, the character string length threshold information can include an exact character string length (e.g., 44 characters), a range of character string lengths (e.g., between 40-50 characters), or a minimum character string length (e.g., over 40 characters). Additionally, the information related to how the character string is entered can include an indication that the OTP information is automatically cut and pasted into a data field and a carriage return is automatically entered after the information is pasted.

FIG. 5B illustrates a more detailed process for monitoring 412 user input and determining 414 whether the information entered into a data field associated with a website includes OTP information as described herein. As shown in FIG. 5B, the system can monitor 520 the user input for one or more characters entered into a data field within a particular website. The system can continue to monitor and determine 522 whether any user input has been detected. If the system does not determine that any user input has been detected, the system can continue to monitor 520 the user input. If, however, the system does determine 522 that user input is detected, the system can perform a series of process steps to determine whether the user input includes (or likely includes) OTP information.

As further shown in FIG. 5B, the system can further process 524 the user input to isolate a character string as entered by the user by either typing the information or automatically generating and entering the information using, for example, an OTP input device as described herein. The system can further process the character string by comparing the character string to the one or more OTP information characteristics as described above. For example, as shown in FIG. 5B, the system can determine whether a portion of the character string matches a previously received and stored string of OTP characters and/or whether the total length of the character string matches a predetermined character string length (e.g., 44 characters). In some examples, the system can also determine whether the input is provided on a login/OTP page or in an application where the system should provide additional processing. If the system determines that the information as entered was provided to and intended for a webpage or application that is not to be further processed, the system can merely provide the information to the webpage or application.

If the system does determines 526 that the character string matches one or more OTP character string criteria or characteristics, the system can store the entered character string in memory and return 528 an indication that the user input may be OTP information. Conversely, if the system does not determine 526 that the character string matches one or more OTP character string criteria or characteristics, the system can further determine 530 whether an entry keystroke rate associated with the character string satisfies one or more keystroke rate thresholds. For example, the system can determine whether the character string was entered at a keystroke rate that exceeds what is possible for a human to manually achieve (e.g., over 100 keystrokes per second or with keystroke intervals having a standard deviation of less than 100 ms). If the system does determine 530 that the keystroke rate associated with entry of the character string does exceed the keystroke rate threshold, the system can store the entered character string in memory and return 528 the indication that the user input may be OTP information.

As further shown in FIG. 5B, if the system does not determine 530 that the keystroke rate associated with entry of the character string exceeds the keystroke rate threshold, the system can further determine 532 how the character string associated with the user input was entered. For example, the system can determine whether the character string was entered using a cut and paste operation. In such an example, if the processor does determine 532 that the character string was entered via a cut and paste operation, the processor can store the entered character string in memory and return 528 an indication that the user input may be OTP information. Conversely, if the system does not determine 532 that a cut and paste operation was used, the system can return and continue to monitor 520 the user input.

It should be noted that the process orders as shown in FIGS. 4, 5A, and 5B and described herein are provided by way of example only. Depending upon the implementation of the processes as described herein, the individual process steps can be altered or otherwise changed. For example, as shown in FIG. 5B, the order of the determination steps 526, 530, and 532 can be altered while still providing a similar process for determining whether user input information includes OTP information as described herein. Additionally, aspects of two or more of the determination steps can be combined. For example, when determining the process used for entering the character string associated with the user input, the system can further determine a character length of the entered character string and compare the character string length in a single determination step.

In certain implementations, the processes as described herein can also be used when logging into a webpage or application that prompts for username/password as well as OTP information. However, when a user is already logged into a specific application such as a Web/SaaS application, the user may only be prompted for a OTP. In such an example, a malicious website and/or attacker may have the username/password information already (e.g., from a previous data breach). The attacker can take advantage of the above situation by sending a spoofed website that appears valid but is only phishing for user information by prompting for the OTP information. As the spoofed website mimics the original website, the user may not appreciate or realize that the attacker is phishing for information. Additionally, conventional phishing monitoring techniques that look for a username/password may not identify this phishing attack as the only prompt is for the OTP information. The processes as taught herein, however, by monitoring specifically for entry of information that is likely OTP information, can be used to prevent the user from accidentally providing sensitive information such as the OTP information as described herein to the attacker. As the processes herein identify and process information that is likely to be OTP information, and do not look for username/password information, such a phishing attack as noted above can be prevented.

Computing Platform for Protection Against Theft of User Credentials

FIG. 6 is a block diagram of a computing platform 600 configured to perform a process for providing protection against theft of user credentials such as OTP information by phishing websites, in accordance with an example of the present disclosure. In some cases, the platform 600 may be a workstation, server, laptop, mobile device, or smartphone.

The computing platform or device 600 includes one or more processors 610, volatile memory 620 (e.g., random access memory (RAM)), non-volatile memory 630, one or more network or communication interfaces 640, user interface (UI) 660, display element (e.g., screen) 670, and a communications bus 650. The computing platform 600 may also be referred to as a computer or a computer system.

The non-volatile (non-transitory) memory 630 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 660 can include one or more input/output (I/O) devices (e.g., a mouse, a keyboard such as the USB OTP keyboards as described herein, a microphone, one or more speakers, one or more biometric scanners, one or more environmental sensors, and one or more accelerometers, etc.).

The display element 670, can provide a graphical user interface (GUI) and in some cases, may be a touchscreen or any other suitable display device.

The non-volatile memory 630 stores an operating system 632, one or more applications 634 (including web browsers), data 636, and elements of phishing protection system 160 of FIG. 1, such that, for example, computer instructions of the operating system 632, the applications 634, and the elements of phishing protection system 160 (such as the password/key protection system 170 as described herein), are executed by processor(s) 610 out of the volatile memory 620. In some examples, the volatile memory 620 can include one or more types of RAM and/or a cache memory that can offer a faster response time than a main memory. Data can be entered through the user interface 660. Various elements of the computer 600 can communicate via the communications bus 650.

The illustrated computing platform 600 is shown merely as an example client device or server and can be implemented by any computing or processing environment with any type of machine or set of machines that can have suitable hardware and/or software capable of operating as described herein.

The processor(s) 610 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor 610 can be analog, digital, or mixed. In some examples, the processor 610 can be one or more physical processors, or one or more virtual (e.g., remotely located or cloud) processors. A processor including multiple processor cores and/or multiple processors can provide functionality for parallel, simultaneous execution of instructions or for parallel, simultaneous execution of one instruction on more than one piece of data.

The network interfaces 640 can include one or more interfaces to enable the computing platform 600 to access a computer network 680 such as a Local Area Network (LAN), a Wide Area Network (WAN), a Personal Area Network (PAN), or the Internet through a variety of wired and/or wireless connections, including cellular connections. In some examples, the network 680 may allow for communication with other computing platforms 690, to enable distributed computing.

In described examples, the computing platform 600 can execute an application on behalf of a user of a client device. For example, the computing platform 600 can execute one or more virtual machines managed by a hypervisor. Each virtual machine can provide an execution session within which applications execute on behalf of a user or a client device, such as a hosted desktop session. The computing platform 600 can also execute a terminal services session to provide a hosted desktop environment. The computing platform 600 can provide access to a remote computing environment including one or more applications, one or more desktop applications, and one or more desktop sessions in which one or more applications can execute.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

What is claimed is:

1. A computer system comprising:

a memory; and at least one processor operably coupled to the memory and configured to:

determine one or more one-time password (OTP) information characteristics generated based on sample input information received via a user input device responsive to registration of the user input device;

recognize a uniform resource locator (URL) to which a web browser is navigating as a URL associated with a website for which phishing protection is to be provided, the recognition based on an absence of the URL from a history of visited URLs for which a user has previously visited;

monitor user input, via the user input device, into one or more data fields associated with the website;

determine whether the user input into the one or more data fields comprises automatically generated OTP information, by comparing the user input against the one or more OTP information characteristics; and

US 12,563,094 B2

17 perform a security action in response to determining that the user input comprises automatically generated OTP information.

2. The computer system of claim 1, wherein:

the memory stores the OTP information, the OTP information comprising a plurality of initial character strings; and the at least one processor being configured to determine whether the user input comprises automatically generated OTP information comprises the at least one processor being further configured to:

determine a first set of characters of the user input;

compare the first set of characters against the plurality of initial character strings stored on the memory;

determine whether the first set of characters matches at least one of the plurality of OTP information initial character strings; and if the first set of characters matches at least one of the plurality of OTP information initial character strings, determine that the user input comprises automatically generated OTP information.

3. The computer system of claim 1, wherein the at least one processor being configured to determine whether the user input comprises automatically generated OTP information comprises the at least one processor being further configured to:

monitor a rate at which a sequence of characters associated with the user input is entered; and in response to the monitored rate exceeding a threshold keystroke rate, determine that the user input comprises automatically generated OTP information.

4. The computer system of claim 1, wherein the at least one processor being configured to determine whether the user input comprises automatically generated OTP information comprises the at least one processor being further configured to:

determine a number of characters included in the user input; and if the number of characters included in the user input exceeds a character threshold, determine that the user input comprises automatically generated OTP information.

5. The computer system of claim 1, wherein the at least one processor being configured to determine whether the user input comprises automatically generated OTP information comprises the at least one processor being further configured to:

detect an operation to paste a character string into the one or more data fields as the user input;

determine a number of characters included in the user input; and if the number of characters included in the user input exceeds a character threshold, determine that the user input comprises automatically generated OTP information.

6. The computer system of claim 1, wherein the at least one processor is further configured to:

receive a request to register the user input device, the user input device configured to generate the automatically generated OTP information;

receive the sample information from the user input device; and determine at least a portion of the one or more OTP information characteristics based upon the sample information.

7. The computer system of claim 1, wherein the at least one processor being configured to perform a security action in response to determining user entry of OTP information comprises the at least one processor being further configured to:

store the OTP information in the memory;

provide an alert to the user indicating entry of the OTP information; and process the OTP information based upon a user response received in reply to the alert.

8. A method of providing protection from phishing attacks, the method comprising:

determining, by a processor, one or more one-time password (OTP) information characteristics generated based on sample input information received via a user input device responsive to registration of the user input device;

recognizing, by the processor, a uniform resource locator (URL) to which a web browser is navigating as a URL associated with a website for which phishing protection is to be provided, the recognition based on an absence of the URL from a history of visited URLs for which a user has previously visited;

monitoring, by the processor, user input via the user input device into one or more data fields associated with the website;

determining, by the processor, whether the user input into the one or more data fields comprises automatically generated OTP information by comparing the user input against the one or more OTP information characteristics; and performing, by the processor, a security action in response to determining that the user input comprises automatically generated OTP information.

9. The method of claim 8, wherein determining whether the user input comprises automatically generated OTP information comprises:

storing, by the processor at a memory operably coupled to the processor, the OTP information, the OTP information comprising a plurality of initial character strings;

determining, by the processor, a first set of characters of the user input;

comparing, by the processor, the first set of characters against the plurality of initial character strings stored on the memory;

determining, by the processor, whether the first set of characters matches at least one of the plurality of OTP information initial character strings; and if the first set of characters matches at least one of the plurality of OTP information initial character strings, determining, by the processor, that the user input comprises automatically generated OTP information.

10. The method of claim 8, wherein determining whether the user input comprises automatically generated OTP information comprises:

monitoring, by the processor, a rate at which a sequence of characters associated with the user input is entered; and in response to the monitored rate exceeding a threshold keystroke rate, determining, by the processor, that the user input comprises automatically generated OTP information.

11. The method of claim 8, wherein determining whether the user input comprises automatically generated OTP information comprises:

determining, by the processor, a number of characters included in the user input; and if the number of characters included in the user input exceeds a character threshold, determining, by the processor, that the user input comprises automatically generated OTP information.

12. The method of claim 8, wherein determining whether the user input comprises automatically generated OTP information comprises:

detecting, by the processor, an operation to paste a character string into the one or more data fields as the user input;

determining, by the processor, a number of characters included in the user input; and if the number of characters included in the user input exceeds a character threshold, determining, by the processor, that the user input comprises automatically generated OTP information.

13. The method of claim 8, further comprising:

receiving, by the processor, a request to register the user input device, the user input device configured to generate the automatically generated OTP information;

receiving, by the processor, the sample information from the user input device; and determining, by the processor, at least a portion of the one or more OTP information characteristics based upon the sample information.

14. The method of claim 8, wherein performing a security action in response to determining user entry of OTP information comprises:

storing, by the processor, the OTP information in a memory operably coupled to the processor;

providing, by the processor, an alert to the user indicating entry of the OTP information; and processing, by the processor, the OTP information based upon a user response received in reply to the alert.

15. A non-transitory computer-readable medium storing computer-executable instructions to implement a process providing protection from phishing attacks, the instructions comprising instructions to:

determine one or more one-time password (OTP) information characteristics generated based on sample input information received via a user input device responsive to registration of the user input device;

recognize a uniform resource locator (URL) to which a web browser is navigating as a URL associated with a website for which phishing protection is to be provided, the recognition based on an absence of the URL from a history of visited URLs for which a user has previously visited;

monitor user input via the user input device into one or more data fields associated with the website;

determine whether the user input into the one or more data fields comprises automatically generated OTP information by comparing the user input against the one or more OTP information characteristics; and perform a security action in response to determining that the user input comprises automatically generated OTP information.

16. The non-transitory computer-readable medium of claim 15, wherein the instructions to determine whether the user input comprises automatically generated OTP information comprise instructions to:

store the OTP information, the OTP information comprising a plurality of initial character strings;

determine a first set of characters of the user input;

compare the first set of characters against the plurality of initial character strings stored on the memory;

determine whether the first set of characters matches at least one of the plurality of OTP information initial character strings; and if the first set of characters matches at least one of the plurality of OTP information initial character strings, determine that the user input comprises automatically generated OTP information.

17. The non-transitory computer-readable medium of claim 15, wherein the instructions to determine whether the user input comprises automatically generated OTP information comprise instructions to:

monitor a rate at which a sequence of characters associated with the user input is entered; and in response to the monitored rate exceeding a threshold keystroke rate, determine that the user input comprises automatically generated OTP information.

18. The non-transitory computer-readable medium of claim 15, wherein the instructions to determine whether the user input comprises automatically generated OTP information comprise instructions to:

determine a number of characters included in the user input; and if the number of characters included in the user input exceeds a character threshold, determine that the user input comprises automatically generated OTP information.

19. The non-transitory computer-readable medium of claim 15, wherein the instructions to determine whether the user input comprises automatically generated OTP information comprise instructions to:

detect an operation to paste a character string into the one or more data fields as the user input;

determine a number of characters included in the user input; and if the number of characters included in the user input exceeds a character threshold, determine that the user input comprises automatically generated OTP information.

20. The non-transitory computer-readable medium of claim 15, further comprising instructions to:

receive a request to register the user input device, the user input device configured to generate the automatically generated OTP information;

receive the sample information from the user input device; and determine at least a portion of the one or more OTP information characteristics based upon the sample information.

21. The non-transitory computer-readable medium of claim 15, wherein the instructions to perform a security action in response to determining user entry of OTP information comprise instructions to:

store the OTP information in a memory;

provide an alert to the user indicating entry of the OTP information; and process the OTP information based upon a user response received in reply to the alert.

* * * * *